United States Patent
Lee et al.

(10) Patent No.: US 12,500,267 B2
(45) Date of Patent: Dec. 16, 2025

(54) LITHIUM SECONDARY BATTERY WITH IMPROVED SAFETY

(71) Applicant: LG Energy Solution, Ltd., Seoul (KR)

(72) Inventors: Wontae Lee, Daejeon (KR); Kyoung Ho Ahn, Daejeon (KR); Chul Haeng Lee, Daejeon (KR); Junhyeok Han, Daejeon (KR); Won-Kyung Shin, Daejeon (KR); Su Hyeon Ji, Daejeon (KR); Youngho Oh, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 533 days.

(21) Appl. No.: 17/983,911

(22) Filed: Nov. 9, 2022

(65) Prior Publication Data

US 2023/0155177 A1 May 18, 2023

(30) Foreign Application Priority Data

Nov. 12, 2021 (KR) .................. 10-2021-0155470
Oct. 20, 2022 (KR) .................. 10-2022-0135402

(51) Int. Cl.
| | |
|---|---|
| *H01M 10/0567* | (2010.01) |
| *H01M 4/36* | (2006.01) |
| *H01M 4/38* | (2006.01) |
| *H01M 4/485* | (2010.01) |
| *H01M 4/505* | (2010.01) |
| *H01M 4/525* | (2010.01) |
| *H01M 4/583* | (2010.01) |
| *H01M 10/0525* | (2010.01) |
| *H01M 10/0568* | (2010.01) |
| *H01M 10/0569* | (2010.01) |
| *H01M 50/46* | (2021.01) |
| *H01M 4/02* | (2006.01) |

(52) U.S. Cl.
CPC ....... *H01M 10/0567* (2013.01); *H01M 4/364* (2013.01); *H01M 4/386* (2013.01); *H01M 4/485* (2013.01); *H01M 4/505* (2013.01); *H01M 4/525* (2013.01); *H01M 4/583* (2013.01); *H01M 10/0525* (2013.01); *H01M 10/0568* (2013.01); *H01M 10/0569* (2013.01); *H01M 50/46* (2021.01); *H01M 2004/027* (2013.01); *H01M 2004/028* (2013.01); *H01M 2300/0028* (2013.01)

(58) Field of Classification Search
CPC .. H01M 10/0567; H01M 4/364; H01M 4/386; H01M 4/485; H01M 4/505; H01M 4/525; H01M 4/583; H01M 10/0525; H01M 10/0568; H01M 10/0569; H01M 50/46; H01M 2004/027; H01M 2004/028; H01M 2300/0028; H01M 4/483; H01M 10/4235; H01M 4/587; H01M 2300/0025; Y02E 60/10
See application file for complete search history.

(56) References Cited

U.S. PATENT DOCUMENTS

| | | | |
|---|---|---|---|
| 2014/0079986 A1 | 3/2014 | Eo et al. | |
| 2015/0079480 A1 | 3/2015 | Ahn et al. | |
| 2016/0028111 A1* | 1/2016 | Ahn | H01M 10/4235 |
| | | | 429/303 |
| 2018/0062158 A1* | 3/2018 | Kim | H01M 4/364 |
| 2018/0358647 A1* | 12/2018 | Koh | H01M 10/0525 |
| 2019/0123390 A1* | 4/2019 | Xu | H01M 4/382 |
| 2022/0278369 A1 | 9/2022 | An et al. | |

FOREIGN PATENT DOCUMENTS

| | | |
|---|---|---|
| CN | 106450438 A | 2/2017 |
| CN | 108359293 A | 8/2018 |
| CN | 109193029 A | 1/2019 |
| CN | 110551151 A | 12/2019 |
| CN | 110931862 A | 3/2020 |
| CN | 111499663 A | 8/2020 |
| CN | 112331916 A | 2/2021 |
| CN | 113130984 A | 7/2021 |
| EP | 2874228 A1 | 5/2015 |
| EP | 2889946 A1 | 7/2015 |
| EP | 2983234 A1 | 2/2016 |
| EP | 3993127 A1 | 5/2022 |
| JP | 2012084384 A | 4/2012 |
| JP | 2012119092 A | 6/2012 |
| JP | 2016503572 A | 2/2016 |
| KR | 20140008264 A | 1/2014 |
| KR | 20140038171 A | 3/2014 |
| KR | 20150050508 A | 5/2015 |
| KR | 20180135318 A | 12/2018 |
| KR | 20210031158 A | 3/2021 |
| WO | 2015025915 A1 | 2/2015 |

OTHER PUBLICATIONS

Zhu et al. "Dimethylacrylamide, a novel electrolyte additive, can improve the electrochemical performances of silicon anodes in lithium-ion batteries." RSC Adv., 2019, 9, 435 (Year: 2019).*
Extended European Search Report including Written Opinion for Application No. 22893061.6 dated Feb. 27, 2025. 10 pgs.

* cited by examiner

*Primary Examiner* — Michael L Dignan
(74) *Attorney, Agent, or Firm* — Lerner David LLP

(57) ABSTRACT

A lithium secondary battery is disclosed herein. The secondary battery has improved high temperature safety and may prevent generation of a large amount of gas under a high temperature condition, which prevents an increase in resistance and a decrease in capacity due to the elution of metal ions from an electrode by uniformly forming a coating film on an electrode surface during activation of the battery. A positive electrode active material of the battery includes a high concentration(s) of nickel and/or manganese and a non-aqueous electrolyte including an additive are used, which improves performance and high-temperature safety of the battery.

12 Claims, No Drawings

LITHIUM SECONDARY BATTERY WITH IMPROVED SAFETY

CROSS-REFERENCE TO RELATED APPLICATIONS

This application claims priority from Korean Patent Application No. 10-2021-0155470, filed on Nov. 12, 2021 and Korean Patent Application No. 10-2021-0135402, filed on Oct. 20, 2022, the disclosures of which are incorporated by reference herein.

TECHNICAL FIELD

The present disclosure relates to a lithium secondary battery with improved safety.

BACKGROUND

Recently, secondary batteries are widely applied not only to small devices such as portable electronic devices, but to medium and large devices such as battery packs or power storage devices of hybrid or electric vehicles. Examples of these secondary batteries may include non-aqueous electrolyte batteries such as lithium-ion batteries, lithium batteries, lithium-ion capacitors, and sodium ion batteries.

Among these non-aqueous electrolyte batteries, lithium-ion batteries are used by injecting an electrolyte into a battery cell including a positive electrode including a positive electrode active material that enables intercalation and deintercalation of lithium and a negative electrode including a negative electrode active material that enables intercalation and deintercalation of lithium. Particularly, an electrolyte uses an organic solvent in which a lithium salt is dissolved, and it is important to determine the stability and performance of a lithium secondary battery.

For example, $LiPF_6$, which is the most widely used lithium salt for an electrolyte, reacts with an electrolyte solvent to promote the depletion of the solvent and generate HF. The HF generated thereby may not only generate a large amount of gas under a high temperature condition, but also elute metal ions from a positive electrode active material, and when the eluted metal ions are generated in the form of a precipitate on the surface of a negative electrode, it causes an increase in potential of a negative electrode and a drop in cell open-circuit voltage (OCV), leading to problems such as degraded battery performance as well as a reduction in lifespan and high-temperature safety.

BRIEF SUMMARY

Technical Problem

Therefore, the present disclosure is directed to providing a developed technology that can inhibit gas generation under a high temperature condition by reducing a metal ion precipitation phenomenon on an electrode surface by forming a coating film on the electrode surface, and improve a battery OCV drop phenomenon.

Technical Solution

To solve the above-described problem,
one embodiment of the present disclosure provides a lithium secondary battery, which includes:

an electrode assembly that includes a positive electrode, a negative electrode, and a separator interposed between the positive electrode and the negative electrode; and an electrolyte composition that includes a non-aqueous organic solvent, a lithium salt, and an electrolyte additive for a secondary battery, which includes a compound represented by Formula 1 below:

[Formula 1]

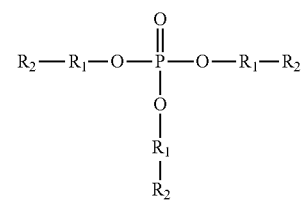

wherein, each $R_1$ is independently a single bond, an alkylene group having 1 to 10 carbon atoms, or

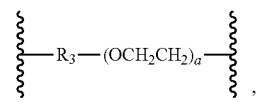

each $R_2$ is independently hydrogen, an acrylate group, or a methacrylate group, $R_3$ is a single bond or an alkylene group having 1 to 4 carbon atoms, and a is an integer of 1 to 10.

Specifically, each $R_1$ may be independently a single bond, a methylene group, an ethylene group, a propylene group, or

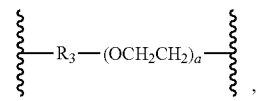

$R_3$ may be a single bond or an ethylene group, and a may be an integer of 1 to 5.

More specifically, the compound represented by Formula 1 may be one or more of the compounds of Structural Formula 1 to Structural Formula 8 below:

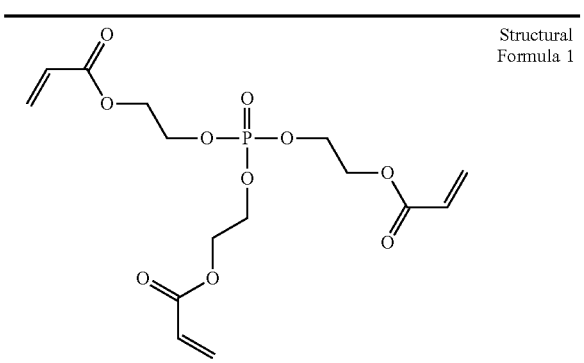

Structural Formula 1

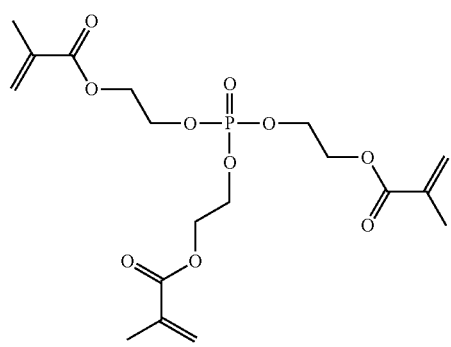 [SMILES: C=C(C)C(=O)OCCOP(=O)(OCCOC(=O)C(=C)C)OCCOC(=O)C(=C)C]

Structural Formula 2

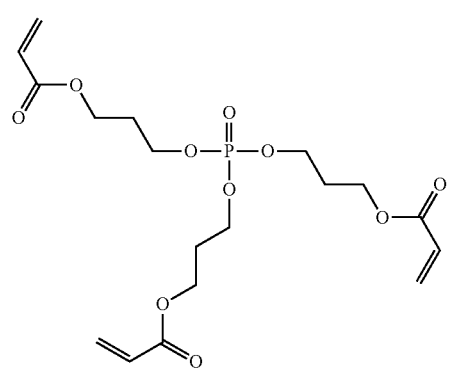 [SMILES: C=CC(=O)OCCCOP(=O)(OCCCOC(=O)C=C)OCCCOC(=O)C=C]

Structural Formula 3

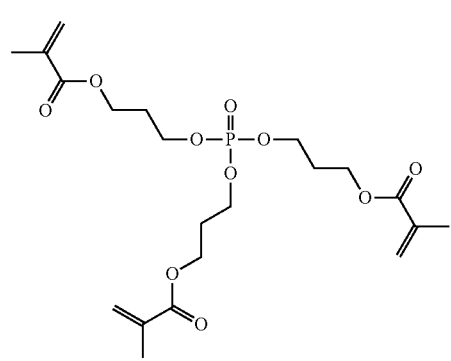 [SMILES: C=C(C)C(=O)OCCCOP(=O)(OCCCOC(=O)C(=C)C)OCCCOC(=O)C(=C)C]

Structural Formula 4

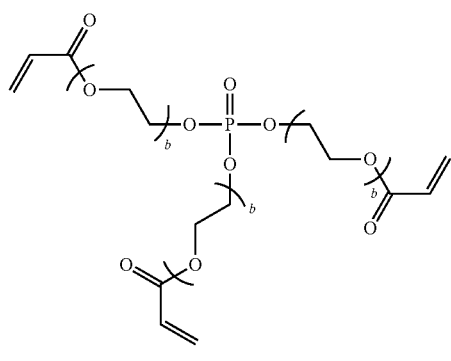

Structural Formula 5 b = 2~4

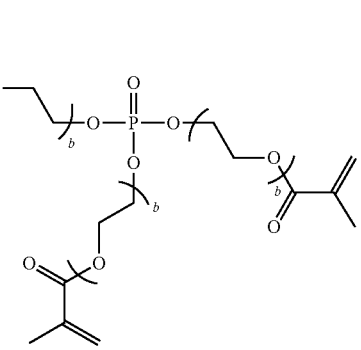

Structural Formula 6 b = 2~4

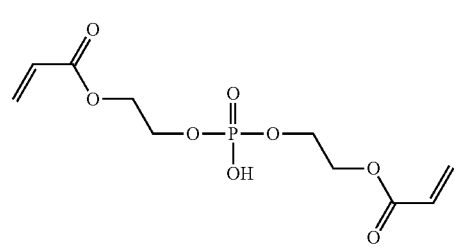 [SMILES: C=CC(=O)OCCOP(=O)(O)OCCOC(=O)C=C]

Structural Formula 7

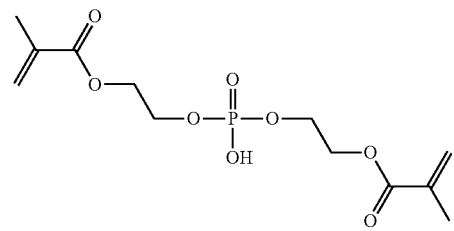 [SMILES: C=C(C)C(=O)OCCOP(=O)(O)OCCOC(=O)C(=C)C]

Structural Formula 8

In addition, the compound represented by Formula 3 may be present in an amount of 0.01 to 5 wt % with respect to the total weight of the electrolyte composition.

Moreover, the electrolyte composition may further include a compound represented by Formula 2 below:

[Formula 2]

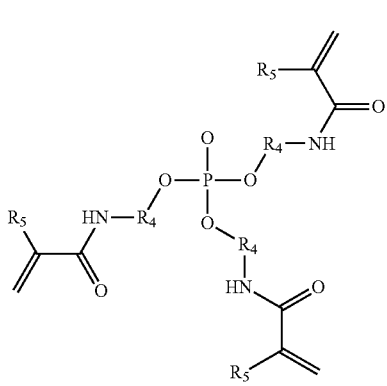

wherein, each $R_4$ is independently an alkylene group having 1 to 10 carbon atoms, or

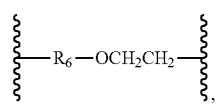

each $R_5$ is independently hydrogen or an alkyl group having 1 to 4 carbon atoms, each $R_6$ is independently a single bond or an alkylene group having 1 to 4 carbon atoms.

Specifically, the compound represented by Formula 2 includes a compound represented by Formula 3 below:

[Formula 3]

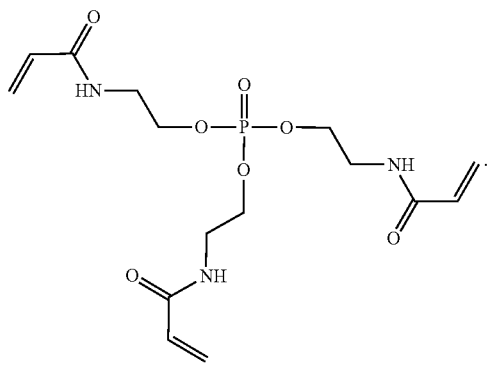

In addition, the compound represented by Formula 2 may be present in an amount of 0.01 to 3 wt % with respect to the total weight of the electrolyte composition.

Moreover, the lithium salt may include one or more selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, and (FSO$_2$)$_2$NLi.

In addition, the non-aqueous organic solvent may include N-methyl-2-pyrrolidinone, ethylene carbonate, propylene carbonate, butylene carbonate, dimethyl carbonate, diethyl carbonate, γ-butyrolactone, 1,2-dimethyoxy ethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

In addition, the positive electrode comprises a positive electrode active material, wherein the positive electrode active material comprises a lithium metal oxide, and wherein the lithium metal oxide comprises a lithium metal oxide represented by Formula 4, a lithium metal oxide represented by Formula 5, or a combination thereof:

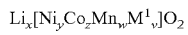 [Formula 4]

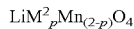 [Formula 5]

wherein, $M^1$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, x, y, z, w and v satisfy $1.0 \leq x \leq 1.30$, $0.5 \leq y < 1$, $0 \leq z < 0.3$, $0 < w \leq 0.3$, and $0 \leq v \leq 0.1$, respectively, wherein y+z+w+v=1, $M^2$ is Ni, Co or Fe, and p is $0.05 \leq p \leq 0.6$.

Specifically, the positive electrode active material may include one or more selected from the group consisting of LiNi$_{0.8}$Co$_{0.1}$Mn$_{0.1}$O$_2$, LiNi$_{0.6}$Co$_{0.2}$Mn$_{0.2}$O$_2$, LiNi$_{0.9}$Co$_{0.05}$Mn$_{0.05}$O$_2$, LiNi$_{0.6}$Co$_{0.2}$Mn$_{0.1}$Al$_{0.1}$O$_2$, LiNi$_{0.6}$Co$_{0.2}$Mn$_{0.15}$Al$_{0.05}$O$_2$, LiNi$_{0.7}$Co$_{0.1}$Mn$_{0.1}$Al$_{0.1}$O$_2$, and LiNi$_{0.5}$Mn$_{1.5}$O$_4$.

In addition, the negative electrode comprises a negative electrode active material, wherein the negative electrode active material may consist of a carbon material and a silicon material, wherein the silicon material may include one or more of silicon (Si), silicon carbide (SiC) and silicon oxide (SiOq, $0.8 \leq q \leq 2.5$).

Moreover, the silicon material may be present in an amount of 1 to 20 wt % with respect to the total weight of the negative electrode active material.

Advantageous Effects

A secondary battery according to the present disclosure can prevent the generation of a large amount of gas under a high temperature condition, effectively prevent an increase in resistance of a cell and a decrease in capacity due to the elution of metal ions from an electrode by uniformly forming a coating film on an electrode surface in the activation of the battery because a positive electrode active material including a high concentration(s) of nickel and/or manganese as well as an additive having specific components for a non-aqueous electrolyte are used, thereby effectively improving the performance and high-temperature safety of the battery.

DETAILED DESCRIPTION

The present disclosure may have various modifications and various examples, and thus specific examples are illustrated in the drawings and described in detail in the detailed description.

However, it should be understood that the present disclosure is not limited to specific embodiments, and includes all modifications, equivalents or alternatives within the spirit and technical scope of the present disclosure.

The terms "comprise," "include" and "have" used herein designate the presence of characteristics, numbers, steps, actions, components or members described in the specification or a combination thereof, and it should be understood that the possibility of the presence or addition of one or more other characteristics, numbers, steps, actions, components, members or a combination thereof is not excluded in advance.

In addition, when a part of a layer, film, region or plate is disposed "on" another part, this includes not only a case in which one part is disposed "directly on" another part, but a case in which a third part is interposed therebetween. In contrast, when a part of a layer, film, region or plate is disposed "under" another part, this includes not only a case in which one part is disposed "directly under" another part, but a case in which a third part is interposed therebetween. In addition, in this application, "on" may include not only a case of disposed on an upper part but also a case of disposed on a lower part.

In addition, in the present disclosure, the "included as a main component" may mean that a defined component is included at 50 wt % or more, 60 wt % or more, 70 wt % or more, 80 wt % or more, 90 wt % or more, or 95 wt % or more with respect to the total weight. For example, the "graphite is included as a main ingredient in a negative electrode active material" means that graphite is included at 50 wt % or more, 60 wt % or more, 70 wt % or more, 80 wt % or more, 90 wt % or more, or 95 wt % or more with respect to the total weight of the negative electrode active material, and in some cases, it means that a negative electrode active material totally consists of graphite, and thus includes 100 wt % of graphite.

Hereinafter, the present disclosure will be described in further detail.

Lithium Secondary Battery

Further, in one embodiment, the present disclosure provides a lithium secondary battery, which includes:
an electrode assembly that includes a positive electrode, a negative electrode, and a separator interposed between the positive electrode and the negative electrode; and
an electrolyte composition that includes a non-aqueous organic solvent, a lithium salt, and an electrolyte additive for a secondary battery, which includes a compound represented by Formula 1 below:

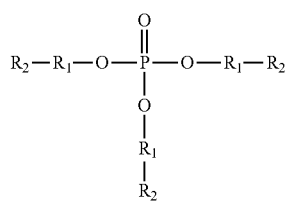

[Formula 1]

wherein,
each $R_1$ is independently a single bond, an alkylene group having 1 to 10 carbon atoms, or

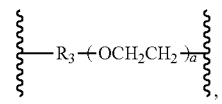

each $R_2$ is independently hydrogen, an acrylate group, or a methacrylate group,
$R_3$ is a single bond or an alkylene group having 1 to 4 carbon atoms, and
a is an integer of 1 to 10.

The lithium secondary battery according to the present disclosure includes a positive electrode including a positive electrode active material, a negative electrode including a negative electrode active material, a separator interposed between the positive electrode and the negative electrode, and the lithium salt-containing non-aqueous electrolyte composition of the present disclosure, which is described above.

Here, the positive electrode may include a lithium metal oxide that contains nickel and/or manganese at a high concentration/high content as a positive electrode active material, and the electrolyte composition may contain an electrolyte additive including specific components, so the generation of a large amount of gas under a high temperature condition can be prevented, it is possible to effectively prevent an increase in cell resistance and a decrease in capacity due to the elution of metal ions from an electrode, and the performance and high-temperature safety of the battery can be effectively improved.

Specifically, the positive electrode includes a positive electrode mixture layer formed by applying, drying, and pressing a positive electrode active material on a positive electrode current collector, and may selectively further include a conductive material, a binder, or other additives as needed.

Here, the positive electrode active material is a material that can cause an electrochemical reaction on the positive electrode current collector and may include one or more lithium metal oxides represented by Formula 4 and Formula 5, which enable the reversible intercalation and deintercalation of lithium ions:

[Formula 4]

[Formula 5]

wherein,
$M^1$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo,
x, y, z, w and v satisfy $1.0 \le x \le 1.30$, $0.5 \le y < 1$, $0 < z \le 0.3$, $0 < w \le 0.3$, and $0 \le v \le 0.1$, respectively, wherein $y+z+w+v=1$,
$M^2$ is Ni, Co or Fe, and
p is $0.05 \le p \le 0.6$.

The lithium metal oxides represented by Formula 4 and Formula 5 are materials containing nickel (Ni) and manganese (Mn) at high contents, respectively, and have advantages of stably supplying high capacity and/or high voltage electricity when used as a positive electrode active material. In addition, the activation of the secondary battery requires a high charging potential of about 4.0V or more to form a coating film on the surface of the positive electrode and/or the negative electrode. Unlike the conventional positive electrode active materials with a charging potential of less than 4.0V such as iron phosphate, the lithium metal oxides have a high charging potential of about 4.0 or more, and thus, a coating film may be formed easily on the electrode.

Here, examples of the lithium metal oxides represented by Formula 4 may include $LiNi_{0.8}Co_{0.1}Mn_{0.1}O_2$, $LiNi_{0.6}Co_{0.2}Mn_{0.2}O_2$, $LiNi_{0.9}Co_{0.05}Mn_{0.05}O_2$, $LiNi_{0.6}Co_{0.2}Mn_{0.1}Al_{0.1}O_2$, $LiNi_{0.6}Co_{0.2}Mn_{0.15}Al_{0.05}O_2$, and $LiNi_{0.7}Co_{0.1}Mn_{0.1}Al_{0.1}O_2$, and examples of the lithium metal oxides represented by Formula 5 may include $LiNi_{0.7}Mn_{1.3}O_4$; $LiNi_{0.5}Mn_{1.5}O_4$; and $LiNi_{0.3}Mn_{1.7}O_4$, and these oxides may be used alone or in combination.

In addition, in the positive electrode, as a positive electrode current collector, a material that does not cause a chemical change in the corresponding battery and has high conductivity may be used. For example, stainless steel, aluminum, nickel, titanium, or calcined carbon may be used and in the case of aluminum or stainless steel, one whose surface is treated with carbon, nickel, titanium or silver may also be used. In addition, the average thickness of the current collector may be suitably selected within 3 to 500 m in consideration of the conductivity and total thickness of the positive electrode to be formed.

In addition, the negative electrode, like the positive electrode, includes a negative electrode mixture layer formed by applying, drying and pressing a negative electrode active material on a negative electrode current collector, and may selectively further include a conductive material, a binder, or other additives as needed.

The negative electrode active material may include a carbon material and a silicon material. Specifically, the carbon material refers to a material that has a carbon atom as the main component, and examples of the carbon materials may include one or more selected from the group consisting of natural graphite, artificial graphite, expanded graphite, non-graphitizing carbon, carbon black, acetylene black, and Ketjen black. In addition, the silicon material refers to a material that has a silicon atom as the main component, and may include silicon (Si), silicon carbide (SiC), silicon monoxide (SiO) or silicon dioxide ($SiO_2$) alone or in combination. When, as the silicon (Si)-containing materials, silicon monoxide (SiO) and silicon dioxide ($SiO_2$) are uniformly mixed or combined to be included in the negative electrode mixture layer, these materials may be represented as a silicon oxide ($SiO_q$, $0.8 \leq q \leq 2.5$).

In addition, the silicon material may be present in an amount of 1 to 20 wt %, and specifically, 3 to 10 wt %, 8 to 15 wt %, 13 to 18 wt %, or 2 to 8 wt % with respect to the total weight of the negative electrode active material. The present disclosure may maximize the energy density of the battery by controlling the content of the silicon material in the above content range.

In addition, the negative electrode current collector is not particularly limited as long as it has high conductivity without causing a chemical change in the battery, and for example, copper, stainless steel, nickel, titanium or calcined carbon may be used, and in the case of copper or stainless steel, one whose surface is treated with carbon, nickel, titanium or silver may be used. Furthermore, the average thickness of the negative electrode current collector may be suitably selected within 1 to 500 m in consideration of the conductivity and total thickness of the negative electrode to be formed.

Meanwhile, the separator interposed between the positive electrode and the negative electrode of each unit cell is an insulating thin film having high ion permeability and high mechanical strength, and is not particularly limited as long as it is one that is commonly used in the art. Specifically, the separator may include one or more polymers selected from chemical-resistant and hydrophobic polypropylene, polyethylene and a polyethylene-propylene copolymer. The separator may have the form of a porous polymer substrate, such as a sheet or non-woven fabric including the above-described polymer, and in some cases, have the form of a composite separator in which organic or inorganic particles on the porous polymer substrate are coated with an organic binder. In addition, the separator may have an average pore diameter of 0.01 to 10 m, and an average thickness of 5 to 300 m.

Further, the secondary battery includes the above-described non-aqueous electrolyte composition according to the present disclosure as an electrolyte.

The electrolyte composition may be a liquid electrolyte which has a composition in which a lithium salt and an electrolyte additive are included in a non-aqueous organic solvent. Here, the electrolyte composition includes a compound represented by Formula 1 below as an electrolyte additive:

[Formula 1]

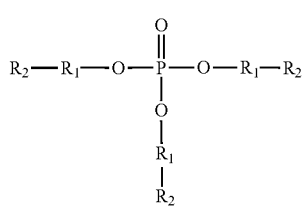

wherein, each $R_1$ is independently a single bond, an alkylene group having 1 to 10 carbon atoms, or

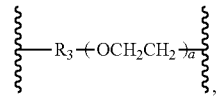

each $R_2$ is independently hydrogen, an acrylate group or a methacrylate group, $R_3$ is a single bond or an alkylene group having 1 to 4 carbon atoms, and a is an integer of 1 to 10.

As the compound represented by Formula 1 has a mother nucleus including a structure in which an acrylate group binds to two or more oxygen atoms in a phosphate via an unsaturated hydrocarbon chain and/or an alkylene glycol unit, an organic and/or inorganic coating film(s) may be uniformly formed on the surface of a positive electrode and/or a negative electrode in the activation of the secondary battery. Therefore, the electrolyte additive may inhibit the generation of gas due to decomposition of an electrolyte when the battery is exposed to a high temperature, and improve phenomena such as increased resistance of the battery and/or decreased capacity, so the performance and high-temperature safety of the battery may be more improved.

To this end, in the compound represented by Formula 1, each $R_1$ may be independently a single bond, an alkylene group having 1 to 6 carbon atoms, or

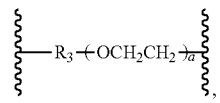

each $R_2$ may be independently hydrogen, an acrylate group, or a methacrylate group, $R_3$ may be a single bond, a methylene group, or an ethylene group, and a may be an integer of 1 to 10.

Specifically, each $R_1$ may e be independently a single bond, a methylene group, an ethylene group, a propylene group, or

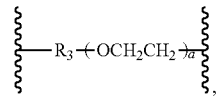

$R_3$ may be a single bond or an ethylene group, and a may be an integer of 1 to 5.

In one example, the compound represented by Formula 1 may be one or more compounds selected from Structural Formulas 1 to 8 below:

Structural Formula 1
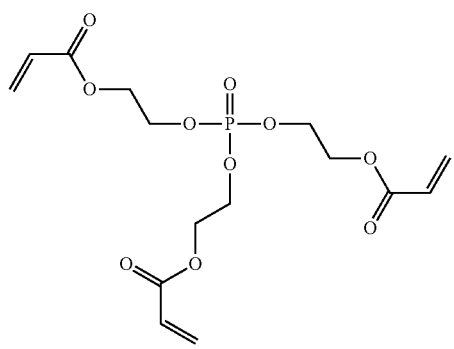 [SMILES: C=CC(=O)OCCOP(=O)(OCCOC(=O)C=C)OCCOC(=O)C=C]

Structural Formula 2
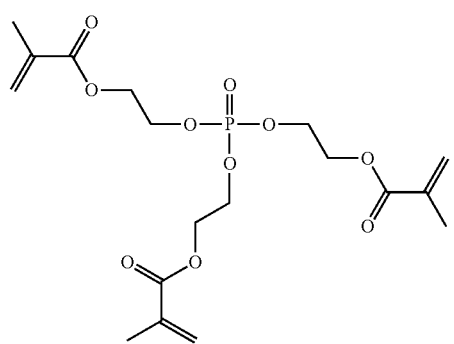 [SMILES: C=C(C)C(=O)OCCOP(=O)(OCCOC(=O)C(=C)C)OCCOC(=O)C(=C)C]

Structural Formula 3
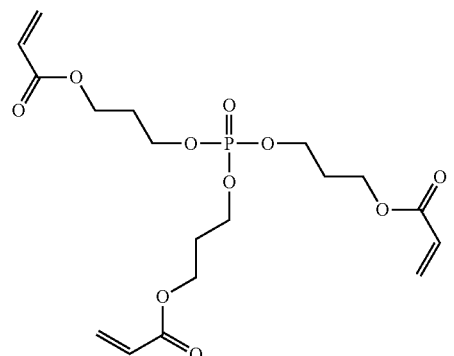

Structural Formula 4
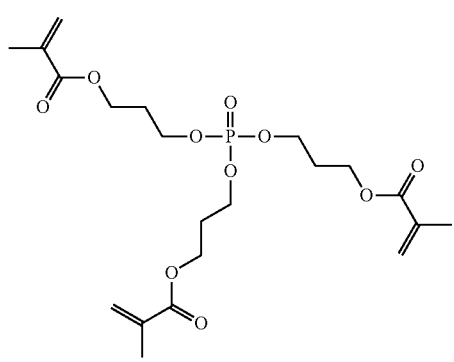 [SMILES: C=C(C)C(=O)OCCCOP(=O)(OCCCOC(=O)C(=C)C)OCCCOC(=O)C(=C)C]

Structural Formula 5
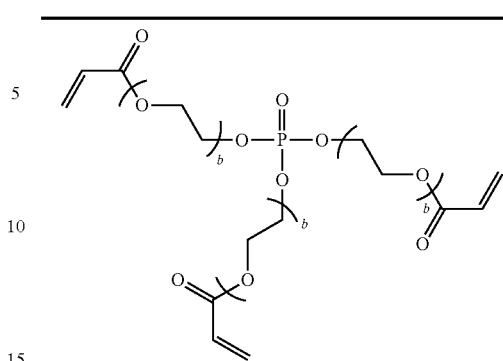
b = 2~4

Structural Formula 6
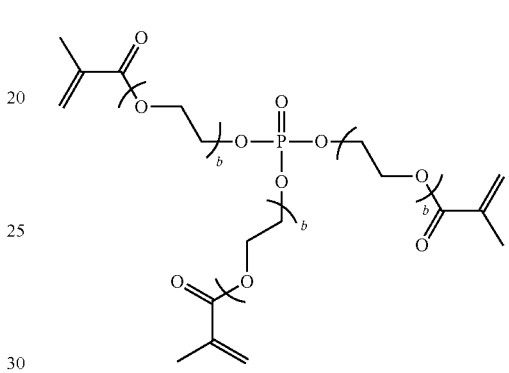
b = 2~4

Structural Formula 7
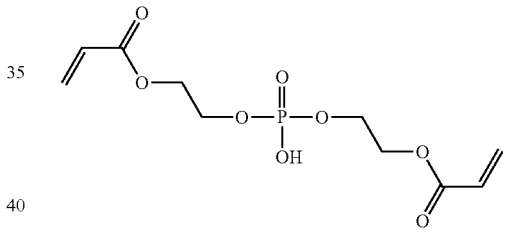

Structural Formula 8
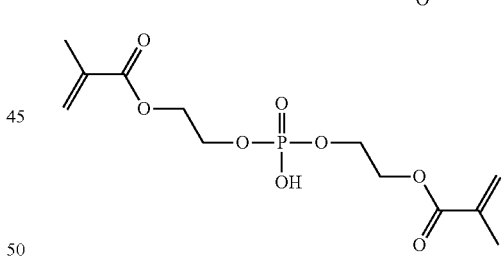

As described above, since the electrolyte additive includes a mother nucleus with a structure in which an acrylate group binds to two or more of the oxygen atoms in a phosphate via an unsaturated hydrocarbon chain and/or an alkylene glycol unit, the electrolyte additive may be directly involved in a solvation shell of lithium ions even under a low potential in the activation of the battery to uniformly form an inorganic coating film through a reduction reaction on the surface of the negative electrode, and uniformly form an inorganic coating film through an oxidation reaction on the surface of the positive electrode at the same time.

In addition, the compound represented by Formula 1 may be included at a certain content in the electrolyte composition. Specifically, the compound represented by Formula 1 may be present in an amount of 0.01 to 5 wt %, and more specifically 0.05 to 3 wt %, 0.5 to 2.5 wt %, 0.5 to 2.0 wt %, or 0.7 to 1.8 wt % with respect to the total weight of the electrolyte composition. The present disclosure may prevent capacity from being reduced by increasing battery resistance at a high temperature using the electrolyte additive at a high content that exceeds the above range. In addition, the present disclosure may prevent the additive effect from being insignificantly implemented by using the electrolyte additive at a trace amount outside the above range.

In addition, the electrolyte composition may further include a compound of Formula 2 below in addition to the electrolyte additive represented by Formula 1:

[Formula 2]

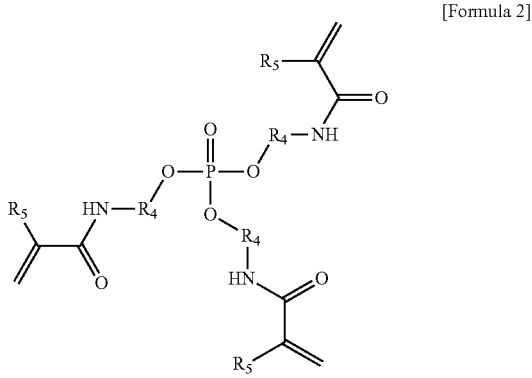

wherein,
each $R_4$ is independently an alkylene group having 1 to 10 carbon atoms, or

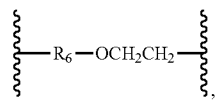

each $R_5$ is independently hydrogen or an alkyl group having 1 to 4 carbon atoms,
each $R_6$ is independently a single bond or an alkylene group having 1 to 4 carbon atoms.

In one example, the compound represented by Formula 2 includes a compound represented by Formula 3 below:

[Formula 3]

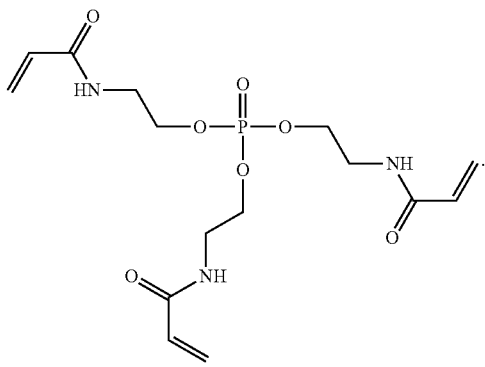

As the compound represented by Formula 2 may include a double bond at the end and participate in the formation of a coating film on an electrode surface in the activation of the battery, along with the electrolyte additive, while inhibiting metal elution generated from the positive electrode active material, battery durability and electrical performance at a high temperature may be improved by including a phosphate group and an amide group.

Here, the compound represented by Formula 2 may be included at a certain content in the electrolyte composition. Specifically, the compound represented by Formula 2 may be present in an amount of 0.01 to 3 wt %, and more specifically, 0.05 to 3 wt %, 0.1 to 1 wt % or 0.3 to 0.8 wt % with respect to the total weight of the electrolyte composition. The present disclosure may prevent an increase in viscosity of the electrolyte composition to prevent the wettability of an electrode and a separator from being degraded by using the compound represented by Formula 4 at a high content that exceeds the above range. In addition, the present disclosure may prevent the additive effect from being insignificantly implemented by using the electrolyte additive at a trace amount outside the above range.

Meanwhile, the lithium salt used in the electrolyte composition may be applied without particular limitation as long as it is used in a non-aqueous electrolyte in the art. Specifically, the lithium salt may include one or more selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, and $(FSO_2)_2NLi$.

The concentration of the lithium salt is not particularly limited, and the lower limit of the appropriate concentration range is 0.5 mol/L or more, specifically 0.7 mol/L or more, and more specifically 0.9 mol/L or more, and the upper limit of the appropriate concentration range is 2.5 mol/L or less, specifically 2.0 mol/L or less, and more specifically 1.5 mol/L or less. When the concentration of the lithium salt is lower than 0.5 mol/L, there is a risk that ion conductivity is reduced, and the cycle characteristics and output characteristics of a non-aqueous electrolyte battery are lowered. In addition, when the concentration of the lithium salt exceeds 2.5 mol/L, the viscosity of an electrode for non-aqueous electrolyte battery increases, and thus there is a risk of decreasing ion conductivity and lowering the cycle characteristics and output characteristics of a non-aqueous electrolyte battery.

In addition, when a large amount of lithium salt is dissolved in a non-aqueous organic solvent at one time, the liquid temperature may increase because of the dissolution heat for the lithium salt. As described above, when the temperature of the non-aqueous organic solvent significantly increases due to the dissolution heat for the lithium salt, there is a risk that the decomposition may be accelerated to generate hydrogen fluoride (HF). Hydrogen fluoride (HF) is not preferable because it causes degraded battery performance. Therefore, a temperature at which the lithium salt is dissolved in a non-aqueous organic solvent may be adjusted to −20 to 80° C., and specifically 0 to 60° C., but the present disclosure is not particularly limited thereto.

Furthermore, a non-aqueous organic solvent used in the electrolyte composition may be applied without particular limitation as long as it can be used in a non-aqueous electrolyte in the art. Specifically, examples of the non-aqueous organic solvents may include aprotic organic solvents such as N-methyl-2-pyrrolidinone, ethylene carbonate (EC), propylene carbonate, butylene carbonate, dimethyl carbonate, diethyl carbonate, γ-butyrolactone, 1,2-dimethyoxy ethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl citrate, phosphoric acid triester, trimethoxy methane, a dioxolane derivative, sulfolane, methyl sulfolane, 1,3-diethyl-2-imidazolidinone, a propylene carbonate derivative, a tetrahydrofuran derivative, ether, methyl propionate, and ethyl propionate.

In addition, as a non-aqueous solvent used in the present disclosure, one type of the above examples may be used alone, or two or more types thereof may be used by mixing in any combination and ratio according to purpose. In terms of electrochemical stability against the oxidation/reduction of the solvent and chemical stability against heat or the reaction with a solute, among the above examples, particularly, propylene carbonate, ethylene carbonate, fluoroethylene carbonate, diethyl carbonate, dimethyl carbonate, or ethyl methyl carbonate is preferable.

Meanwhile, the electrolyte composition may further include an additive, other than the above-described basic components. Without departing the gist of the present disclosure, an additive generally used in the non-aqueous electrolyte of the present disclosure may be added at any ratio. Specifically, the additive may be a compound having an overcharge prevention effect, a negative electrode coating film-forming effect, and a positive electrode protection effect, such as cyclohexylbenzene, biphenyl, t-butylbenzene, vinylene carbonate, vinylethylene carbonate, difluoroanisole, fluoroethylene carbonate, propane sultone, succinonitrile, or dimethylvinylene carbonate. In addition, in the case of use in a non-aqueous electrolyte battery called a lithium polymer battery, it is possible to use an electrolyte for a non-aqueous electrolyte battery after being pseudo-solidified by a gelling agent or cross-linked polymer.

Hereinafter, the present disclosure will be described in further detail with reference to examples and an experimental example.

However, the following examples and experimental example merely illustrate the present disclosure, and the content of the present disclosure is not limited to the following examples and experimental example.

Preparation Example 1 to 12. Preparation of Electrolyte Composition

A 1M $LiPF_6$ lithium salt was dissolved in a solvent in which ethylene carbonate (EC) and ethyl methyl carbonate (EMC) were mixed in a volume ratio of 3:7, and an electrolyte additive represented by Formula 1 and a compound represented by Formula 3 were then dissolved to have a weight ratio shown in Table 1 below with respect to the total weight of the electrolyte, thereby preparing a non-aqueous electrolyte composition.

TABLE 1

| Units: wt % | Compound of Formula 3 Type | Compound of Formula 3 Content | Amount of Compound of Formula 4 used |
|---|---|---|---|
| Preparation Example 1 | (acrylate structure) | 0.1 | — |
| Preparation Example 2 | | 0.5 | — |
| Preparation Example 3 | | 1 | — |
| Preparation Example 4 | | 2 | — |
| Preparation Example 5 | | 5 | — |
| Preparation Example 6 | (methacrylate structure) | 0.1 | — |
| Preparation Example 7 | | 0.5 | — |
| Preparation Example 8 | | 1 | — |
| Preparation Example 9 | | 2 | — |
| Preparation Example 10 | | 5 | — |

TABLE 1-continued

| | Compound of Formula 3 | | Amount of Compound of Formula 4 used |
|---|---|---|---|
| Units: wt % | Type | Content | |
| Preparation Example 11 | (structure shown) 80-95:5~20 (wt./wt.) | 1 | — |
| Preparation Example 12 | (structure shown) | 1 | 0.5 |

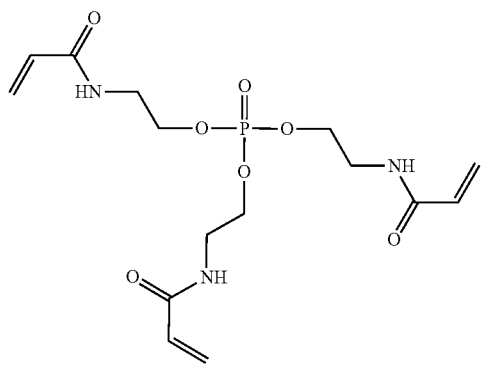 [SMILES: C=CC(=O)OCCOP(=O)(OCCOC(=O)C=C)OCCOC(=O)C=C]

[Formula 3]

Examples 1 to 12. Manufacture of Lithium Secondary Battery

A positive electrode was manufactured by preparing $LiNi_{0.8}Co_{0.1}Mn_{0.05}Al_{0.05}O_4$ having a particle size of 5 µm as a positive electrode active material, preparing a slurry by mixing the positive electrode active material with a carbon-based conductive material and polyvinylidene fluoride as a binder in a weight ratio of 94:3:3 in N-methyl pyrrolidone (NMP), casting the slurry on an aluminum thin film, drying the slurry in a vacuum oven at 120° C., and rolling the resultant.

Separately, a negative electrode was manufactured by preparing a negative electrode active material in which artificial graphite and silicon oxide ($SiO_2$) were mixed in a weight ratio of 9:1, preparing a slurry by mixing 97 parts by weight of the negative electrode active material and 3 parts by weight of styrene butadiene rubber (SBR) with water, casting the slurry on a copper thin film, drying the slurry in a vacuum oven at 130° C., and rolling the resultant.

A 2.1-Ah small pouch-type lithium secondary battery was manufactured by interposing a separator consisting of 18-µm polypropylene between the positive electrode and negative electrode obtained above, inserting the resultant into a case, and injecting the electrolyte composition (5 ml) prepared in each of Preparation Examples 1 to 12 as shown in Table 2 below.

TABLE 2

| | Type of electrolyte composition |
|---|---|
| Example 1 | Electrolyte composition of Preparation Example 1 |
| Example 2 | Electrolyte composition of Preparation Example 2 |
| Example 3 | Electrolyte composition of Preparation Example 3 |
| Example 4 | Electrolyte composition of Preparation Example 4 |
| Example 5 | Electrolyte composition of Preparation Example 5 |
| Example 6 | Electrolyte composition of Preparation Example 6 |
| Example 7 | Electrolyte composition of Preparation Example 7 |
| Example 8 | Electrolyte composition of Preparation Example 8 |
| Example 9 | Electrolyte composition of Preparation Example 9 |
| Example 10 | Electrolyte composition of Preparation Example 10 |
| Example 11 | Electrolyte composition of Preparation Example 11 |
| Example 12 | Electrolyte composition of Preparation Example 12 |

Comparative Example 1. Manufacture of Lithium Secondary Battery

A lithium secondary battery was manufactured in the same manner as in Example 1, except that an electrolyte in which 1M LiPF$_6$ as a lithium salt was dissolved in a solvent in which ethylene carbonate (EC) and ethyl methyl carbonate (EMC) were mixed in a volume ratio of 3:7 was used without an electrolyte additive.

Experimental Example

The following experiment was performed to evaluate the gas generation reduction effect and high-temperature safety of the lithium secondary battery according to the present disclosure.
Analysis of Change in Resistance and Capacity of Secondary Battery after High Temperature Storage
While each of the secondary batteries manufactured in Examples and Comparative Example was stored at 60° C. for 12 weeks, the change in resistance and capacity of the battery was observed.
Specifically, the activation charge/discharge of each secondary battery was performed twice at 0.2 C/0.5 C, and then a charging/discharging experiment was performed once with a standard charge/discharge current density of 0.5 C/0.2 C, a final charging voltage of 4.8V (Li/graphite), and a final discharging voltage of 3.0 V (Li/graphite).
Afterward, the resistance and capacity of the battery were measured at intervals of 2 weeks while the battery was fully charged at 4.2V of 0.33 C and stored at a high temperature of 60° C. Here, after measuring the resistance and capacity of the battery, the battery was fully charged and stored. The amount of change based on the initial resistance and initial capacity of the battery was calculated from the measured resistance and capacity of the battery, and the results are shown in Table 3 below.
Analysis of Amount of Gas Generation of Secondary Battery Stored at High Temperature
While each of the secondary batteries manufactured in Examples and Comparative Example was stored at 60° C. for 12 weeks, the amount of gas generated from the battery was analyzed at intervals of 2 weeks. Specifically, the activation charge/discharge of each secondary battery was performed twice at 0.2 C/0.5 C, and then a charging/discharging experiment was performed once with a standard charge/discharge current density of 0.5 C/0.2 C, a final charging voltage of 4.8V (Li/graphite), and a final discharging voltage of 3.0 V (Li/graphite).
Afterward, the battery was fully charged with 4.2V of 0.33 C, and stored at a high temperature of 60° C. for 12 weeks. After 12 weeks, the surface of the secondary battery was pressed to degas, and the amount of the degassed gas was measured. The result is shown in Table 3 below.

TABLE 3

| | Amount of gas generation | Resistance increase rate | Capacity retention rate |
|---|---|---|---|
| Example 1 | 2955 μl | 5.79% | 94.60% |
| Example 2 | 2530 μl | −0.43% | 95.58% |
| Example 3 | 2511 μl | −0.39% | 95.62% |
| Example 4 | 2327 μl | −0.53% | 95.06% |
| Example 5 | 2321 μl | −1.85% | 94.18% |
| Example 6 | 3003 μl | 6.07% | 94.03% |
| Example 7 | 2936 μl | −0.34% | 94.45% |
| Example 8 | 2932 μl | 2.7% | 94.35% |

TABLE 3-continued

| | Amount of gas generation | Resistance increase rate | Capacity retention rate |
|---|---|---|---|
| Example 9 | 2546 μl | −0.35% | 94.61% |
| Example 10 | 2523 μl | −3.12% | 93.99% |
| Example 11 | 2485 μl | −0.42% | 95.70% |
| Example 12 | 2350 μl | −0.46% | 95.78% |
| Comparative Example 1 | 3269 μl | 8.89% | 94.14% |

As shown in Table 3, since the secondary batteries of Examples included an electrolyte composition including a positive electrode active material containing a high content of nickel and the compound represented by Formula 1 as an electrolyte additive, it can be seen that they have excellent electrical performance and safety at a high temperature.
Specifically, compared with the secondary battery of Comparative Example, it was shown that the secondary batteries of Examples have a significantly less amount of gas, a small increase in resistance of the battery, and a high capacity retention rate although exposed to a high temperature condition.
From the above results, as the secondary battery according to the present disclosure uses an additive of a specific component in a non-aqueous electrolyte, along with a positive electrode active material including a high concentration(s) of nickel and/or manganese, thereby uniformly forming a coating film on an electrode surface in the activation of a battery, it is possible to prevent the generation of a large amount of gas under a high temperature condition and effectively prevent an increase in cell resistance and a decrease in capacity when metal ions are eluted from the electrode, resulting in effective improvement in performance and high-temperature safety of the battery.
As above, the present disclosure has been described with reference to exemplary embodiments, but it should be understood by those killed in the art or those of ordinary skill in the art that the present disclosure can be variously modified and changed without departing from the spirit and technical scope of the present disclosure described in the accompanying claims.
Accordingly, the technical scope of the present disclosure is not limited to the content described in the detailed description of the specification, but should be defined by the claims.

The invention claimed is:
1. A lithium secondary battery, comprising:
an electrode assembly having a positive electrode, a negative electrode, and a separator interposed between the positive electrode and the negative electrode; and
an electrolyte composition having a non-aqueous organic solvent, a lithium salt, and an electrolyte additive for a secondary battery, which comprises a compound represented by Formula 1 and a compound represented by Formula 2:

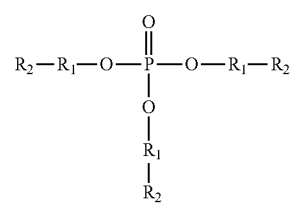

[Formula 1]

wherein, each $R_1$ is independently a single bond, an alkylene group having 1 to 10 carbon atoms, or

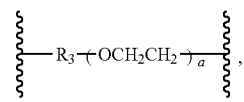

each $R_2$ is independently hydrogen, an acrylate group, or a methacrylate group, $R_3$ is a single bond or an alkylene group having 1 to 4 carbon atoms, and a is an integer of 1 to 10,

[Formula 2]

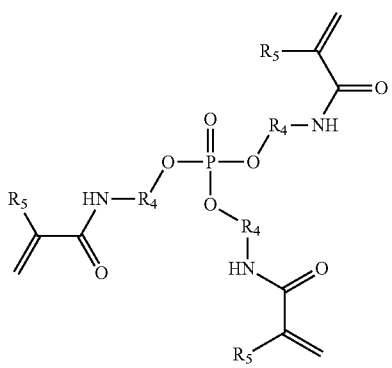

wherein, each $R_4$ is independently an alkylene group having 1 to 10 carbon atoms, or

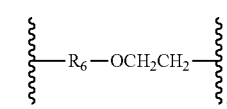

each $R_5$ is independently hydrogen or an alkyl group having 1 to 4 carbon atoms, each $R_6$ is independently a single bond or an alkylene group having 1 to 4 carbon atoms.

2. The battery of claim 1, wherein each $R_1$ is independently a single bond, a methylene group, an ethylene group, a propylene group, a propylene group, or

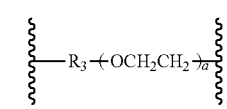

$R_3$ is a single bond or an ethylene group, and a is an integer of 1 to 5.

3. The battery of claim 1, wherein the compound represented by Formula 1 is one or more of the compounds of Structural Formula 1 to Structural Formula 8 below:

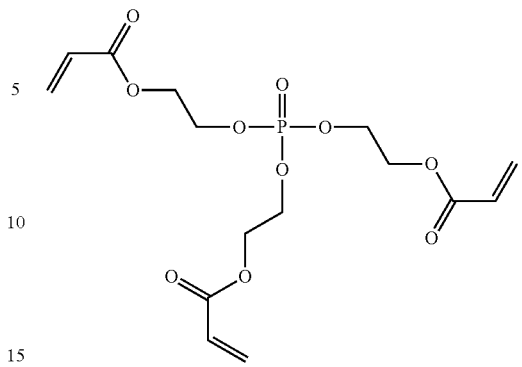

Structural Formula 1

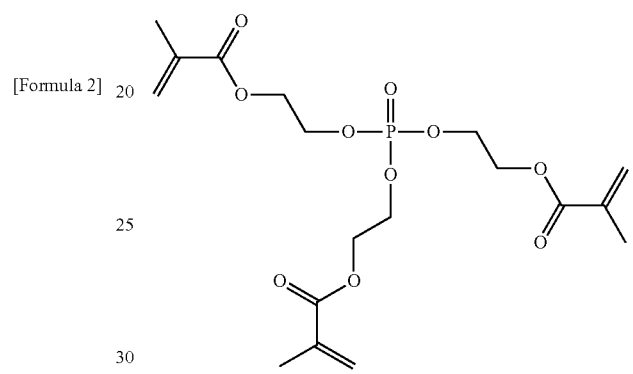

Structural Formula 2

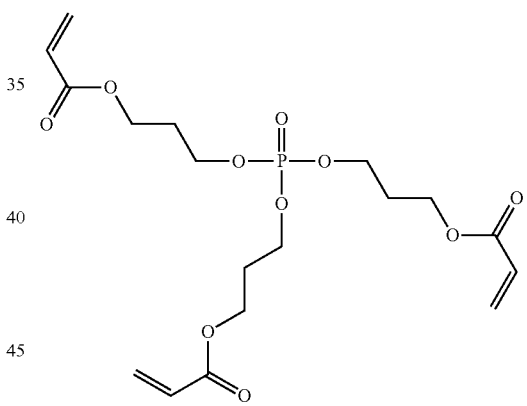

Structural Formula 3

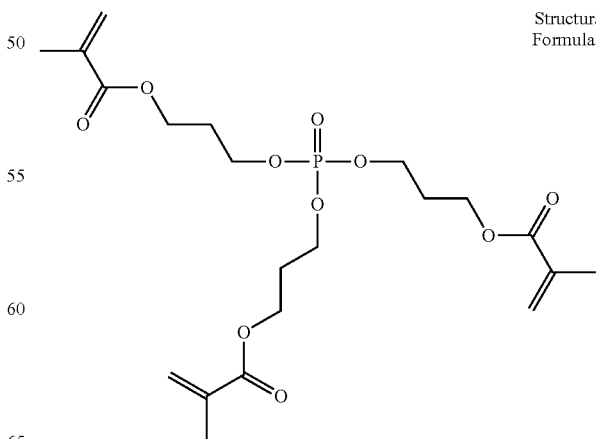

Structural Formula 4

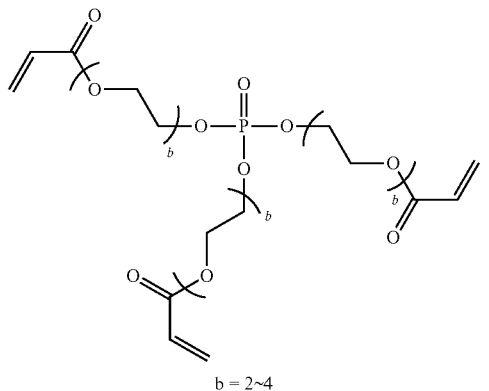

Structural Formula 5 b = 2~4

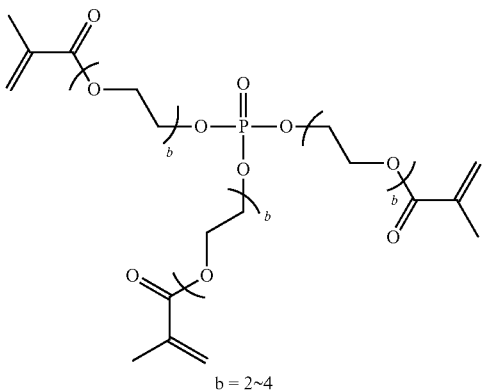

Structural Formula 6 b = 2~4

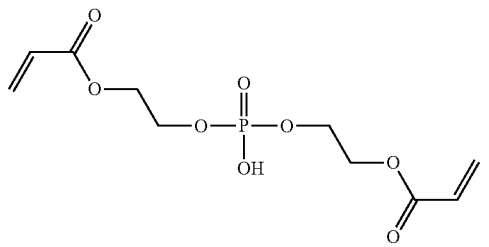 [SMILES: C=CC(=O)OCCOP(=O)(O)OCCOC(=O)C=C]

Structural Formula 7

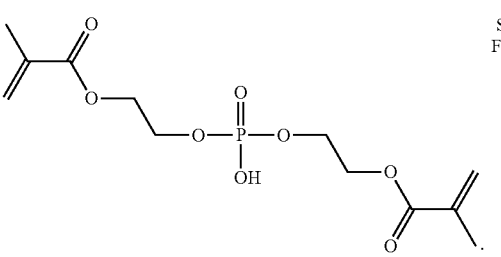

Structural Formula 8.

4. The battery of claim 1, wherein the compound represented by Formula 3 is present in an amount of 0.01 to 5 wt % with respect to the total weight of the electrolyte composition.

5. The battery of claim 1, wherein the compound represented by Formula 2 comprises a compound represented by Formula 3 below:

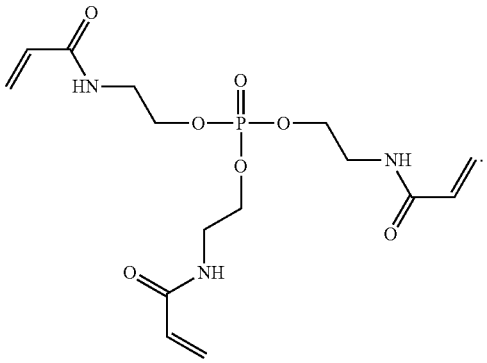

[Formula 3]

6. The battery of claim 1, wherein the compound represented by Formula24 is present in an amount of 0.01 to 3 wt % with respect to the total weight of the electrolyte composition.

7. The battery of claim 1, wherein the lithium salt comprises one or more selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, and $(FSO_2)_2NLi$.

8. The battery of claim 1, wherein the non-aqueous organic solvent comprises N-methyl-2-pyrrolidinone, ethylene carbonate, propylene carbonate, butylene carbonate, dimethyl carbonate, diethyl carbonate, γ-butyrolactone, 1,2-dimethyoxy ethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl citrate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, or ethyl propionate.

9. The battery of claim 1, wherein the positive electrode comprises a positive electrode active material, wherein the positive electrode active material comprises a lithium metal oxide, and wherein the lithium metal oxide comprises a lithium metal oxide represented by Formula 4, a lithium metal oxide represented by Formula 5, or a combination thereof:

$$Li_x[Ni_yCo_zMn_wM^1_v]O_2 \quad [\text{Formula 4}]$$

$$LiM^2_pMn_{(2-p)}O_4 \quad [\text{Formula 5}]$$

in Formulas 4 and 5, $M^1$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, x, y, z, w and v satisfy $1.0 \leq x \leq 1.30$, $0.5 \leq y < 1$, $0 < z \leq 0.3$, $0 < w \leq 0.3$, and $0 \leq v \leq 0.1$, respectively, wherein $y+z+w+v=1$, $M^2$ is Ni, Co or Fe, and p is $0.05 \leq p \leq 0.6$.

10. The battery of claim 9, wherein the positive electrode active material comprises one or more selected from the group consisting of $LiNi_{0.8}Co_{0.1}Mn_{0.1}O_2$, $LiNi_{0.6}Co_{0.2}Mn_{0.2}O_2$, $LiNi_{0.9}Co_{0.05}Mn_{0.05}O_2$, $LiNi_{0.6}Co_{0.2}Mn_{0.1}Al_{0.1}O_2$, $LiNi_{0.6}Co_{0.2}Mn_{0.15}Al_{0.05}O_2$, $LiNi_{0.7}Co_{0.1}Mn_{0.1}Al_{0.1}O_2$, and $LiNi_{0.5}Mn_{1.5}O_4$.

11. The battery of claim 1, wherein the negative electrode comprises a negative electrode active material, wherein the negative electrode active material consists of a carbon material and a silicon material, and Hwerein the silicon material comprises one or more selected from the group consisting of silicon (Si), silicon carbide (SiC) and silicon oxide ($SiO_q$, $0.8 \leq q \leq 2.5$).

12. The battery of claim 11, wherein the silicon material is present in an amount of 1 to 20 wt % with respect to the total weight of the negative electrode active material.

* * * * *